(12) United States Patent
Burns, Jr.

(10) Patent No.: US 9,114,827 B2
(45) Date of Patent: Aug. 25, 2015

(54) YARD MAINTENANCE VEHICLE WITH CABLE STEERING ASSEMBLY FOR TIGHT TURNING

(75) Inventor: Duncan K. Burns, Jr., Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/384,709

(22) PCT Filed: Mar. 15, 2012

(86) PCT No.: PCT/US2012/029142
§ 371 (c)(1),
(2), (4) Date: Sep. 12, 2014

(87) PCT Pub. No.: WO2013/137877
PCT Pub. Date: Sep. 19, 2013

(65) Prior Publication Data
US 2015/0008653 A1    Jan. 8, 2015

(51) Int. Cl.
*B62D 7/08* (2006.01)
*B62D 7/09* (2006.01)
*B62D 7/14* (2006.01)
(Continued)

(52) U.S. Cl.
CPC .. *B62D 7/09* (2013.01); *B62D 3/02* (2013.01); *B62D 7/08* (2013.01); *B62D 7/14* (2013.01); *B62D 7/16* (2013.01); *B62D 7/18* (2013.01); *F16H 19/005* (2013.01); *Y10T 29/49826* (2015.01); *Y10T 74/20402* (2015.01)

(58) Field of Classification Search
CPC .............. B62D 7/08; B62D 7/16; B62D 7/18; B62D 7/14; B62D 1/1632
USPC ................. 280/98, 99, 93.512; 180/9.64, 408
See application file for complete search history.

(56) References Cited

U.S. PATENT DOCUMENTS

| 239,432 | A | * | 3/1881 | Bollee | 180/303 |
| 2,423,266 | A | * | 7/1947 | Stokes | 180/262 |

(Continued)

FOREIGN PATENT DOCUMENTS

| JP | 62120231 A | * | 6/1987 |
| JP | 03070682 A | * | 3/1991 |

OTHER PUBLICATIONS

International Search Report and Written Opinion of PCT/US2012/029142 mailed on Jun. 14, 2012, all enclosed pages cited.

(Continued)

*Primary Examiner* — Nicole Verley
(74) *Attorney, Agent, or Firm* — Nelson Mullins Riley & Scarborough LLP (57) ABSTRACT

A riding yard maintenance vehicle may include a frame, a steering assembly, and a cable. Wheels of the riding yard maintenance vehicle may be attachable to the frame. The steering assembly may include a steering apparatus operably coupled to front wheels of the riding yard maintenance vehicle via a cable system. The cable system may include the cable, which may be wrapped around at least a portion of the steering shaft. The cable may terminate at respective ends thereof at corresponding portions of a turn magnification assembly that indirectly couples the cable to the front wheels. The turn magnification assembly may be configured to approximate Ackermann geometry steering of respective ones of the front wheels based on movement of the cable responsive to rotation of the steering shaft.

20 Claims, 8 Drawing Sheets

(51) Int. Cl.
*B62D 7/16* (2006.01)
*B62D 7/18* (2006.01)
*B62D 3/02* (2006.01)
*F16H 19/00* (2006.01)

(56) References Cited

U.S. PATENT DOCUMENTS

| | | | |
|---|---|---|---|
| 2,676,029 A * | 4/1954 | Hutchinson | 280/99 |
| 2,834,605 A * | 5/1958 | McCollough | 180/410 |
| 2,842,376 A * | 7/1958 | Krilanovich | 180/410 |
| 3,077,354 A * | 2/1963 | Rateau | 280/99 |
| 3,669,466 A * | 6/1972 | Spence | 180/409 |
| 4,504,074 A * | 3/1985 | Smith | 280/93.513 |
| 4,787,646 A * | 11/1988 | Kamlukin et al. | 280/124.113 |
| 4,852,679 A * | 8/1989 | Fry | 180/234 |
| 4,934,726 A * | 6/1990 | Daenens et al. | 280/408 |
| 4,950,126 A * | 8/1990 | Fabiano et al. | 414/590 |
| 4,957,183 A * | 9/1990 | Mullett et al. | 180/234 |
| 5,033,763 A * | 7/1991 | Daenens et al. | 280/426 |
| 5,090,512 A * | 2/1992 | Mullet et al. | 180/236 |
| 5,311,957 A * | 5/1994 | McLaurin et al. | 180/253 |
| 5,529,135 A | 6/1996 | Wenzel et al. | |
| 5,873,592 A * | 2/1999 | Daenens | 280/410 |
| 5,996,723 A * | 12/1999 | Shimizu et al. | 180/444 |
| 6,109,626 A * | 8/2000 | Chapman | 280/47.11 |
| 6,125,963 A * | 10/2000 | Staiger | 180/411 |
| 6,185,920 B1 * | 2/2001 | Oxley | 56/14.7 |
| 6,874,305 B2 * | 4/2005 | Ishimori | 56/10.8 |
| 7,073,822 B1 * | 7/2006 | Renfroe et al. | 280/771 |
| 7,237,629 B1 * | 7/2007 | Bland et al. | 180/6.24 |
| 7,665,748 B2 * | 2/2010 | Okada | 280/99 |
| 8,011,678 B1 * | 9/2011 | Bell et al. | 280/98 |
| 8,459,672 B1 * | 6/2013 | Pollard, Sr. | 280/98 |
| 8,544,246 B2 * | 10/2013 | Jackson et al. | 56/6 |
| 8,882,119 B2 * | 11/2014 | Burns, Jr. | 280/98 |
| 8,888,130 B2 * | 11/2014 | Stark | 280/771 |
| 2003/0019682 A1 * | 1/2003 | Schaedler et al. | 180/308 |
| 2004/0056444 A1 * | 3/2004 | Bidwell | 280/99 |
| 2007/0284839 A1 * | 12/2007 | Sasaoka | 280/93.502 |
| 2008/0277188 A1 * | 11/2008 | Hauser et al. | 180/422 |

OTHER PUBLICATIONS

Chapter I of the International Preliminary Report on Patentability of PCT/US2012/029142 issued on Sep. 16, 2014, all enclosed pages cited.

* cited by examiner

YARD MAINTENANCE VEHICLE WITH CABLE STEERING ASSEMBLY FOR TIGHT TURNING

TECHNICAL FIELD

Example embodiments generally relate to yard maintenance vehicles and, more particularly, relate to steering assembly for vehicles configured for performing lawn maintenance with a relatively tight turning radius.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

By their very nature, riding lawn mowers include steering assemblies that are used to direct the movement of the riding lawn mowers. The steering assemblies often take the familiar form of a steering wheel. However, handlebar assemblies have also been used in some cases. More recently, some zero turn mowers have employed separate steering levers or even a joystick to provide steering functionality. There are clearly a number of steering assembly options from which to choose when an operator considers purchasing a riding lawn mower based on performance criteria, budget restrictions, or personal preference. However, each different type of steering assembly has corresponding different technical challenges associated therewith.

In addition to preferences as to style and cost, some consumers may have a preference for machines that have a feel of providing quality in relation to various different specific features. One feature that can impact a consumer's opinion of quality may be the looseness of the steering assembly. In this regard, for example, a steering wheel that has a noticeable amount of "slack," "slop" or "play" in the coupling between the steering wheel and the wheels may feel inferior to another product that feels as though movement of the steering wheel is more tightly coupled to corresponding movements of the wheels.

BRIEF SUMMARY OF SOME EXAMPLES

Accordingly, in order to improve steering responsiveness, and in some cases, also improve the feel of quality provided by a steering assembly, some example embodiments may provide a steering system that employs a steering cable that engages a turn magnification assembly to provide for Ackermann geometry steering for the wheels of the yard maintenance vehicle.

In one example embodiment, a riding yard maintenance vehicle is provided. The riding yard maintenance vehicle may include a frame, a steering assembly, and a cable. Wheels of the riding yard maintenance vehicle may be attachable to the frame. The steering assembly may include a steering apparatus operably coupled to front wheels of the riding yard maintenance vehicle via a cable system. The cable system may include the cable, which may be wrapped around at least a portion of the steering shaft. The cable may terminate at respective ends thereof at corresponding portions of a turn magnification assembly that indirectly couples the cable to the front wheels. The turn magnification assembly may be configured to approximate Ackermann geometry steering of respective ones of the front wheels based on movement of the cable responsive to rotation of the steering shaft.

In another example embodiment, a cable system is provided. The cable system may provide operable coupling between a steering apparatus of a riding yard maintenance vehicle and front wheels of the riding yard maintenance vehicle. The cable system may include a cable and at least one set of guide pulleys. The cable may be wrapped around a portion of a steering shaft operably coupled to the steering apparatus. The cable may terminate at respective ends thereof at corresponding portions of a turn magnification assembly that indirectly couples the cable to the front wheels. The turn magnification assembly may be configured to approximate Ackermann geometry steering of respective ones of the front wheels based on movement of the cable responsive to rotation of the steering shaft. The at least one set of guide pulleys may receive respective different portions of the cable to guide the cable to respective ones of the first and second shaped cams.

In another example embodiment, a method of providing cable controlled steering for a riding yard maintenance vehicle is provided. The method may include providing a steering assembly including a steering apparatus operably coupled to front wheels of the riding yard maintenance vehicle via a cable system and wrapping a cable around a portion of a steering shaft operably coupled to the steering apparatus. The cable may terminate at corresponding portions of a turn magnification assembly that indirectly couples the cable to the front wheels. The turn magnification assembly may be configured to approximate Ackermann geometry steering of respective ones of the front wheels based on movement of the cable responsive to rotation of the steering shaft. The method may further include providing at least one set of guide pulleys to receive respective different portions of the cable to guide the cable to respective portions of the turn magnification assembly.

Some example embodiments may improve responsiveness of a riding yard maintenance vehicle and also improve a consumer's satisfaction with the steering characteristics of such vehicles.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve steering responsiveness, and may substantially reduce or even eliminate the existence of any slack, slop or play experienced when operating the steering wheel of yard maintenance vehicles such as, for example, riding lawn mowers. In this regard, for example, some embodiments may employ a cable system to support steering functionality, but may utilize the cable system in connection with rotatable cams and steering knuckles that are attached to each other via linkage members that form portions of a turn magnification assembly. Thus, the cable is indirectly coupled to the steering knuckles via the turn magnification assembly. By indirectly coupling the cable to the steering knuckles, the linkage members may be used to geometrically increase the amount of turn that is achievable with a given cam rotation angle relative to an embodiment in which the same given cam rotation angle is used in the context of a cam that is directly coupled to both the steering knuckle and the cable. In some embodiments, a track bar is also provided to extend between the rotatable cams so that the rotation of the cams (and corresponding rotation of the steering knuckles via the linkage members) is such that Ackermann geometry steering is provided. Ackermann geometry steering addresses the problem of inside and outside wheels tracing out circles of different radii when conducting a turn. Without Ackermann geometry steering, at least one of the wheels would need to slip sideways during the turn. To accomplish Ackermann geometry steering, many different methods may be employed. Many such methods attempt to use some sort of arrangement of linkages to cause both the inside and outside front wheels of a four wheeled vehicle to share the same center point for the radii of the circle each of the front wheels traces during a turn. Furthermore, this shared center point is typically at some point extended from a line through the rear axle. Thus, the inside front wheel is turned through a greater angle than the outside front wheel during the turn.

Some example embodiments may provide linkages to support Ackermann geometry steering in connection with a cable steering system. The cable steering system may include a cable that is affixed to a steering shaft at a fixed point and then wound around the steering shaft on either side of the fixed point to provide excess cable to be let out responsive to a turn. Some additional cable may also be wrapped around the steering shaft responsive to the turn and the additional cable may be pulled away from one of the wheels to turn a cam proximate to the corresponding wheel. The cable may be affixed at each of its ends at a corresponding cam in order to cause the cams to rotate in opposite directions. The rotation of each cam may be communicated to a corresponding spindle and steering knuckle via the mechanical linkage in order to increase the amount of turn achievable relative to the amount of cam rotation. The corresponding wheel associated with respective ones of the cams may also turn. The turning of one cam may also be translated to the cam on the other front wheel using a track bar designed for Ackermann geometry steering. For example, the track bar may have a length that is less than the distance between the front wheels and may be configured to cause the inside front wheel for any particular turn inserted to be deflected by a greater angle than the corresponding outside front wheel. Some example embodiments may provide relatively tight coupling between the steering wheel and the front wheels when steering inputs are inserted and may further provide a relatively tight turning radius. Thus, there is no or little noticeable slack when the steering wheel is turned before a corresponding turning of the front wheels is experienced. This may, again, give consumers the general feel of a quality and robust construction. Additionally, a relatively sharp turn may be achieved without substantially tearing up the ground due to wheel slippage during the turn.

Figure 1:
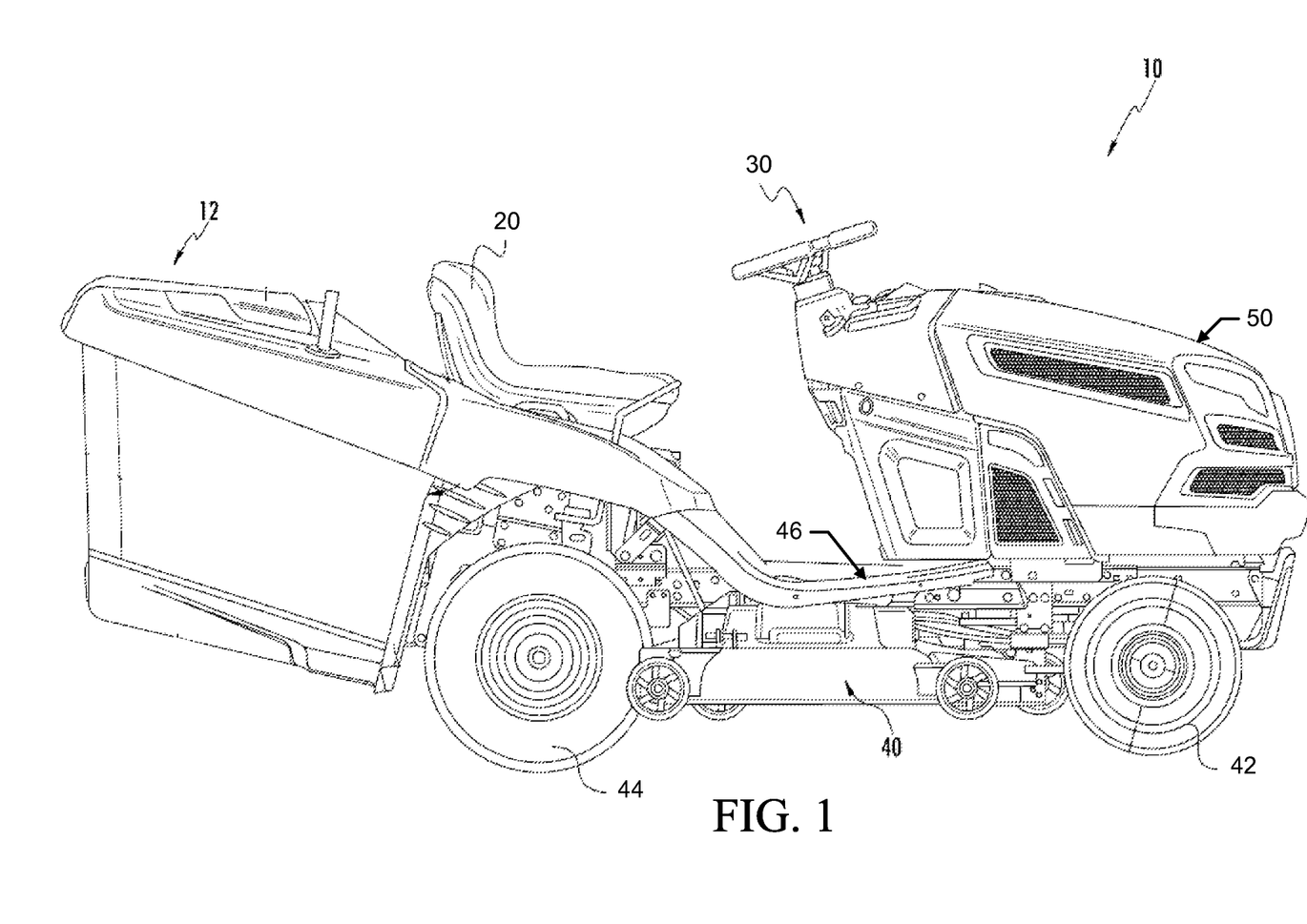
FIG. 1 illustrates a side view of a riding yard maintenance vehicle according to an example embodiment.

FIG. 1 illustrates a side view of a riding yard maintenance vehicle 10 having a bagging attachment 12. However, it should be appreciated that example embodiments may be employed on numerous other riding yard maintenance vehicles that may not include a bagging attachment 12. As shown and described herein, the riding yard maintenance vehicle 10 may be a riding lawn mower (e.g., a lawn tractor, front-mount riding lawn mower, zero-turn riding lawn mower, and/or the like). However, other example embodiments may be employed on riding yard maintenance vehicles that are configured or otherwise equipped to handle snow removal, brush cutting, tilling or other yard maintenance-related activities.

In some embodiments, the riding yard maintenance vehicle 10 may include a seat 20 that may be disposed at a center, rear or front portion of the riding yard maintenance vehicle 10. The riding yard maintenance vehicle 10 may also include a steering assembly 30 (e.g., including a steering wheel, handle bars, or other steering apparatus) functionally connected wheels of the riding yard maintenance vehicle 10 to which steering inputs are provided (e.g., the front and/or rear wheels in various different embodiments) to allow the operator to steer the riding yard maintenance vehicle 10. The operator may sit on the seat 20, which may be disposed to the rear of the steering assembly 30 to provide input for steering of the riding yard maintenance vehicle 10 via the steering assembly 30.

The riding yard maintenance vehicle 10 may also include, or be configured to support attachment of, a cutting deck 40 having at least one cutting blade mounted therein. As indicated above, in some cases, a height of the at least one cutting blade may be adjustable by an operator of the riding yard maintenance vehicle 10. The cutting deck 40 may be a fixed or removable attachment in various different embodiments. Moreover, a location of the cutting deck 40 may vary in various alternative embodiments. For example, in some cases the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. When operating to cut grass, the grass clippings may be captured by a collection system (e.g., bagging attachment 12), mulched, or expelled from the cutting deck 40 via either a side discharge or a rear discharge.

The riding yard maintenance vehicle 10 may also include additional control related components such as one or more speed controllers, cutting height adjusters and/or the like. Some of the controllers, such as the speed controllers, may be provided in the form of foot pedals that may sit proximate to a footrest 46 (which may include a portion on both sides of the riding yard maintenance vehicle 10) to enable the operator to rest his or her feet thereon while seated in the seat 20. However, such controllers may also or alternatively be provided in the form of hand operated levers, buttons, or other operable devices.

In the pictured example embodiment of FIG. 1, an engine 50 of the riding yard maintenance vehicle 10 is disposed substantially forward of a seated operator. However, in other example embodiments, the engine 50 could be in different positions such as below or behind the operator. In some embodiments, the engine 50 may be operably coupled to one or more of the wheels of the riding yard maintenance vehicle 10 in order to provide drive power for the riding yard maintenance vehicle 10. In some embodiments, the engine 50 may be capable of powering one or two wheels, while in others, the engine 50 may power all four wheels of the riding yard maintenance vehicle 10. Moreover, in some cases, the engine 50 may manually or automatically shift between powering either two wheels or all four wheels of the riding yard maintenance vehicle 10.

Figure 2:
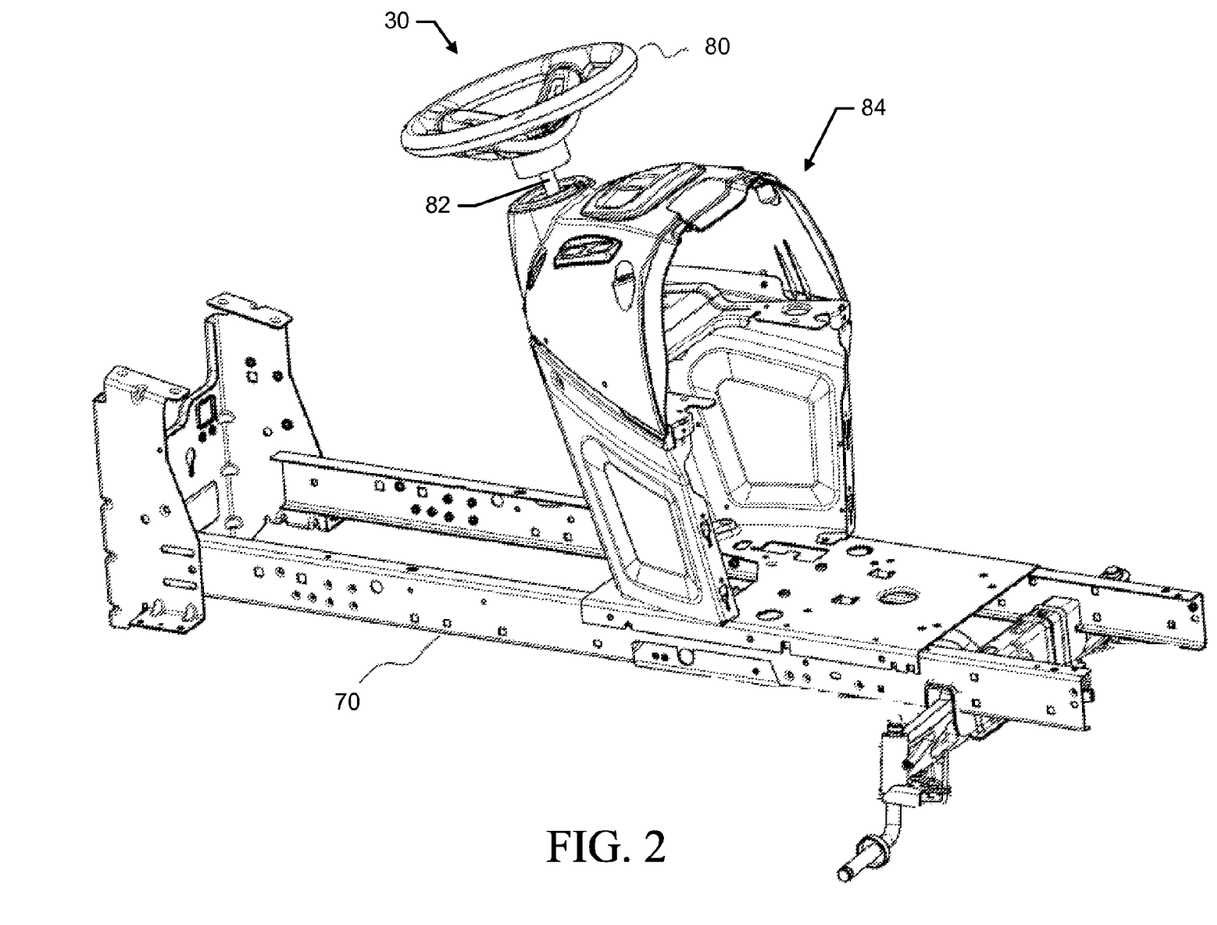
FIG. 2 illustrates a perspective view of a frame of the riding yard maintenance vehicle including some portions of the steering assembly according to an example embodiment.
Figure 3:
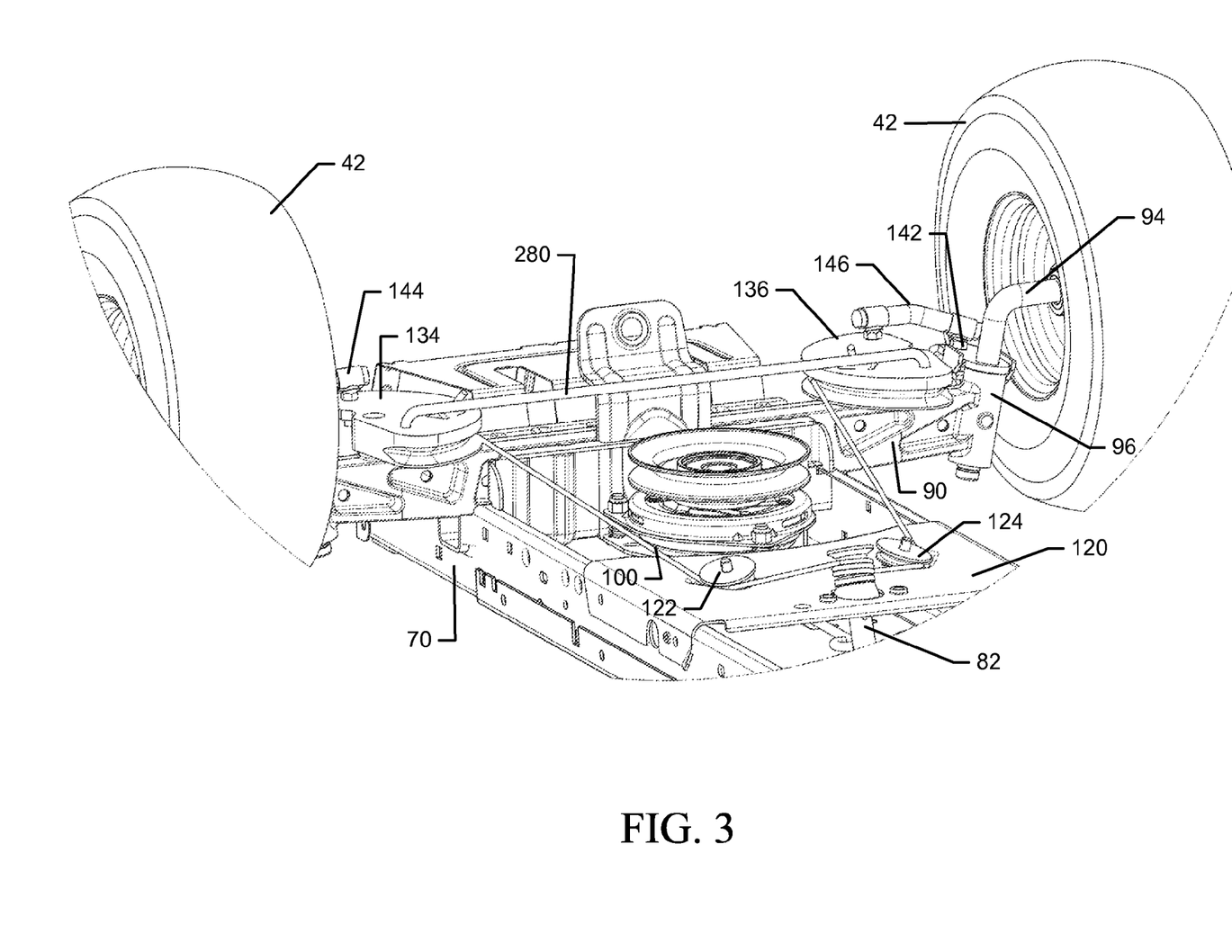
FIG. 3 illustrates a perspective view of internal structural portions of the riding yard maintenance vehicle relating to a steering assembly according to an example embodiment.
Figure 4:
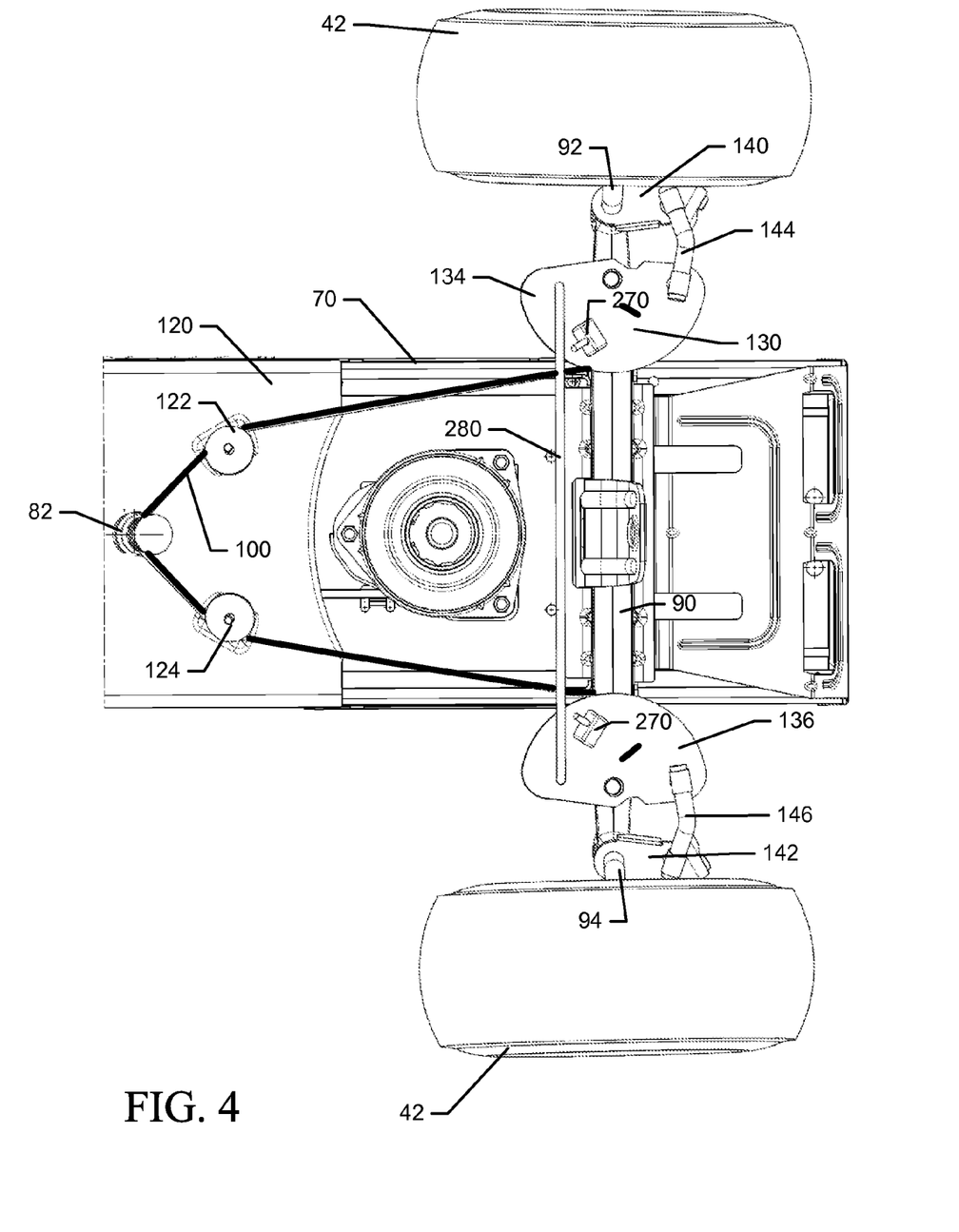
FIG. 4 illustrates a bottom view of the forward portion of the riding yard maintenance vehicle in FIG. 3 according to an example embodiment.
Figure 5:
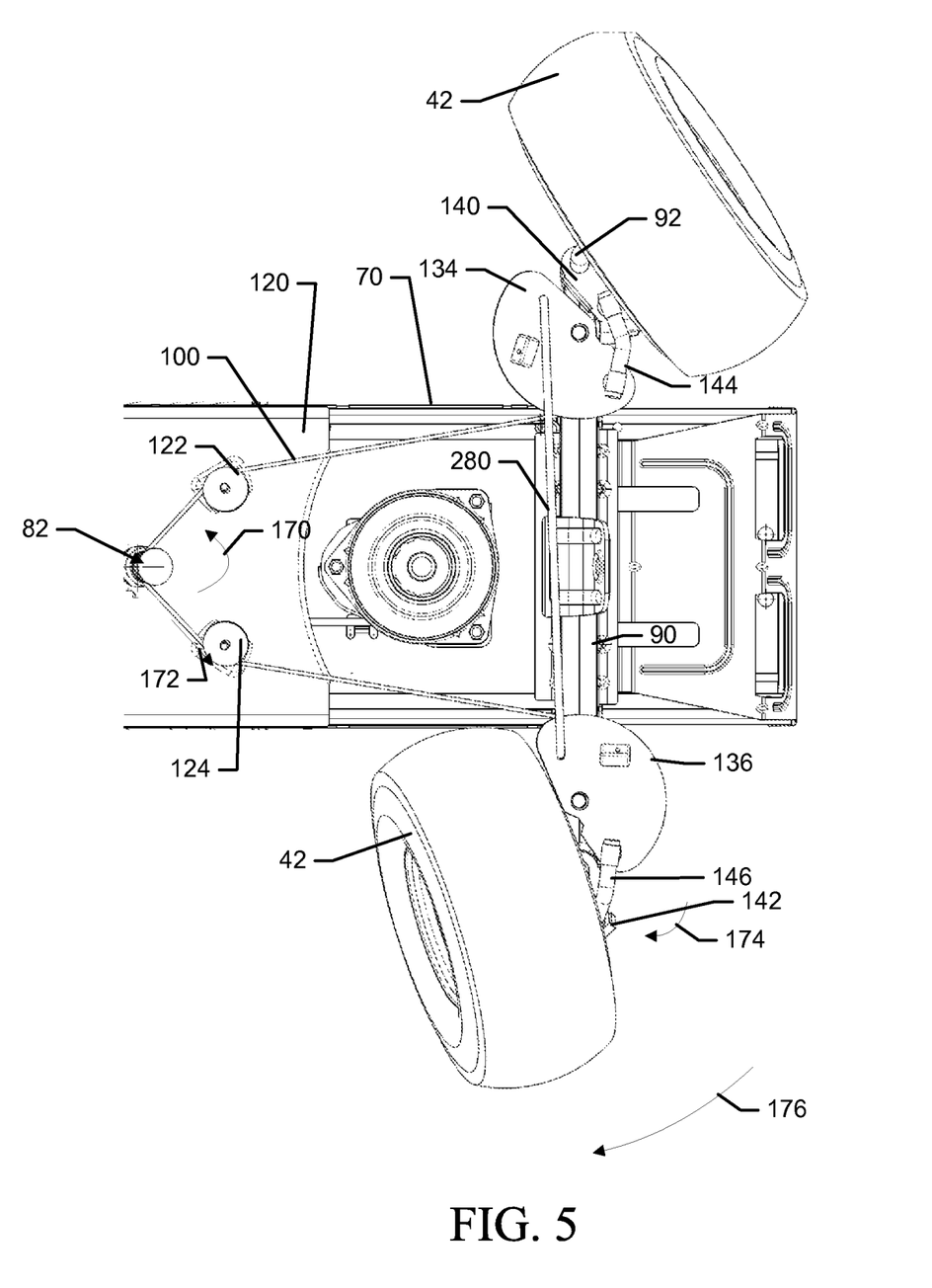
FIG. 5 illustrates a bottom view of the forward portion of the riding yard maintenance vehicle with a steering input inserted according to an example embodiment.
Figure 6:
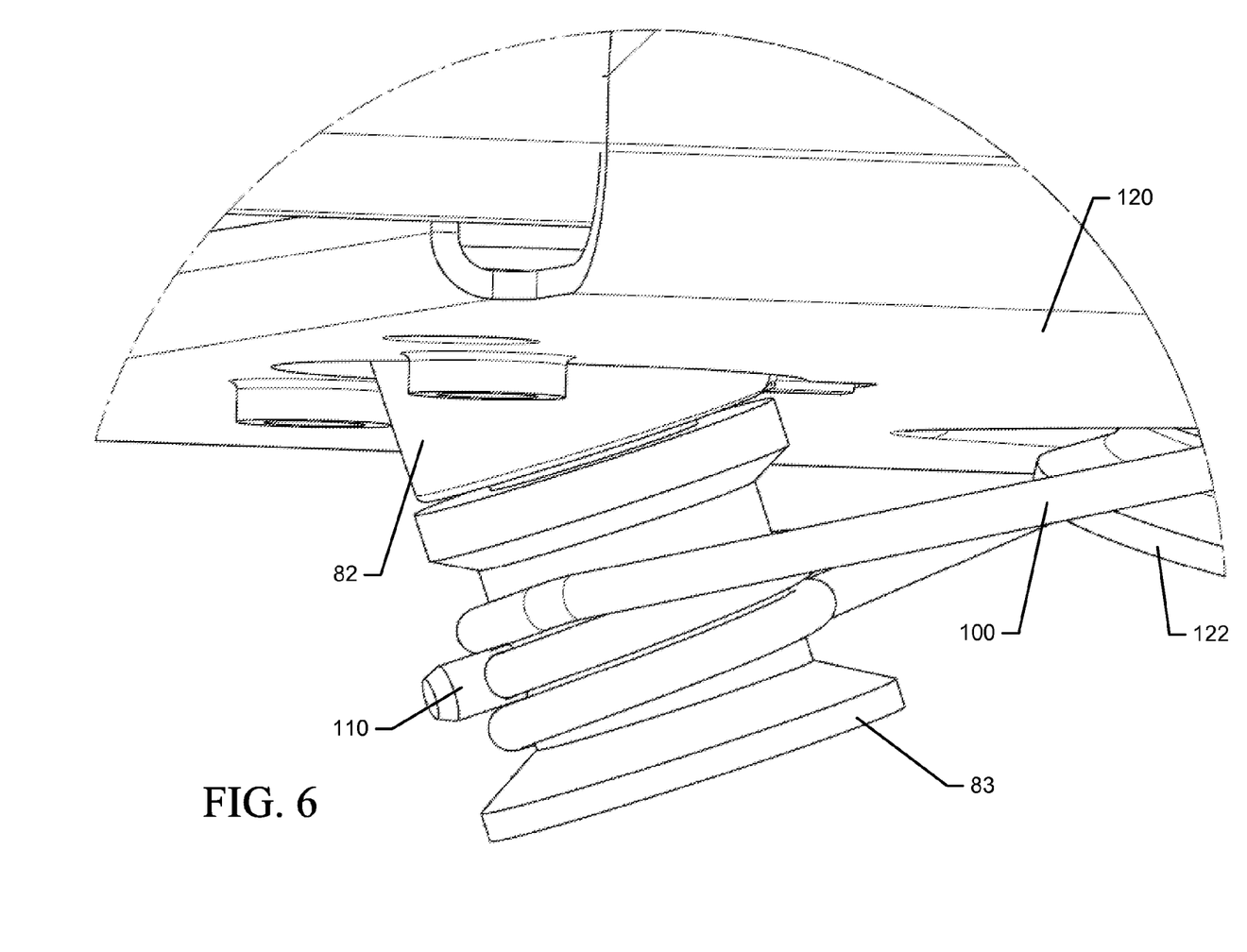
FIG. 6 illustrates a perspective view of cable wrapped around and affixed to the steering shaft according to an example embodiment.
Figure 7:
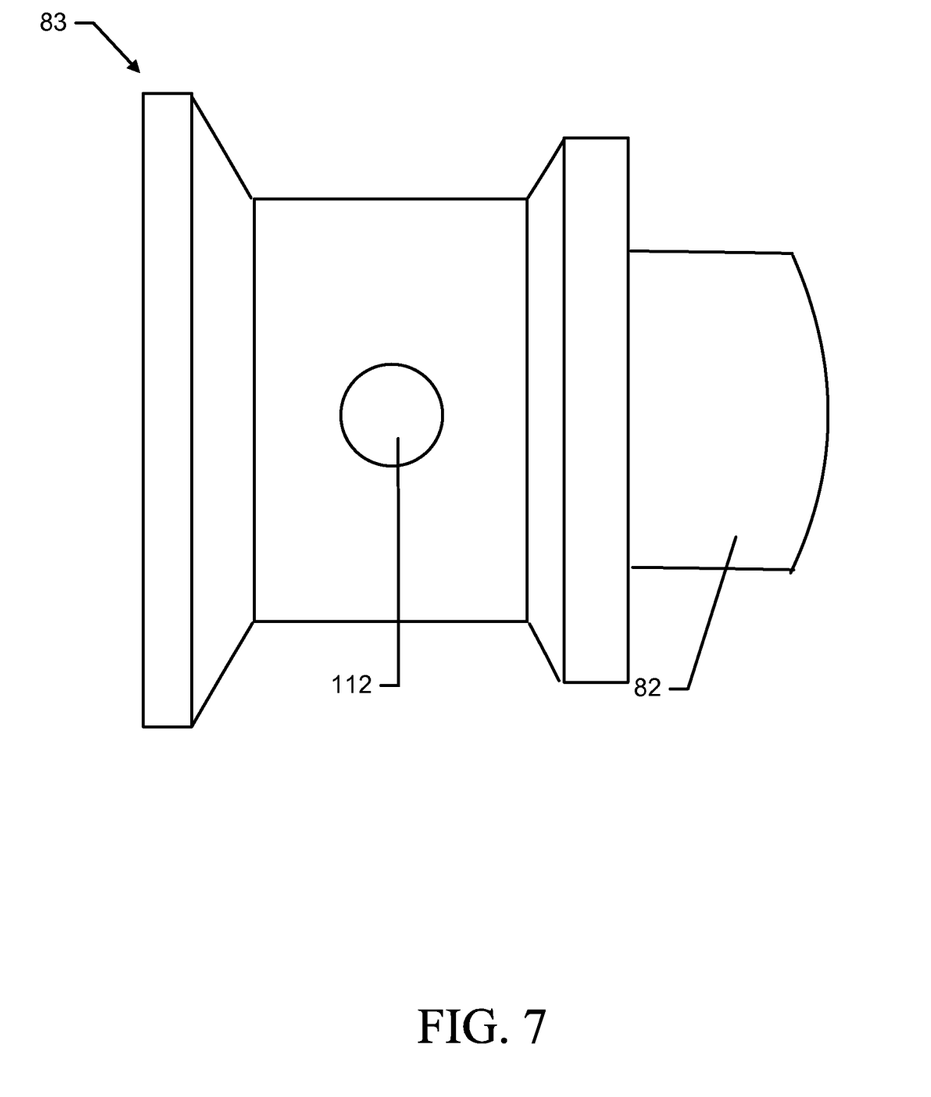
FIG. 7 illustrates a plan view of a retention feature disposed in a steering shaft according to an example embodiment.
Figure 8:
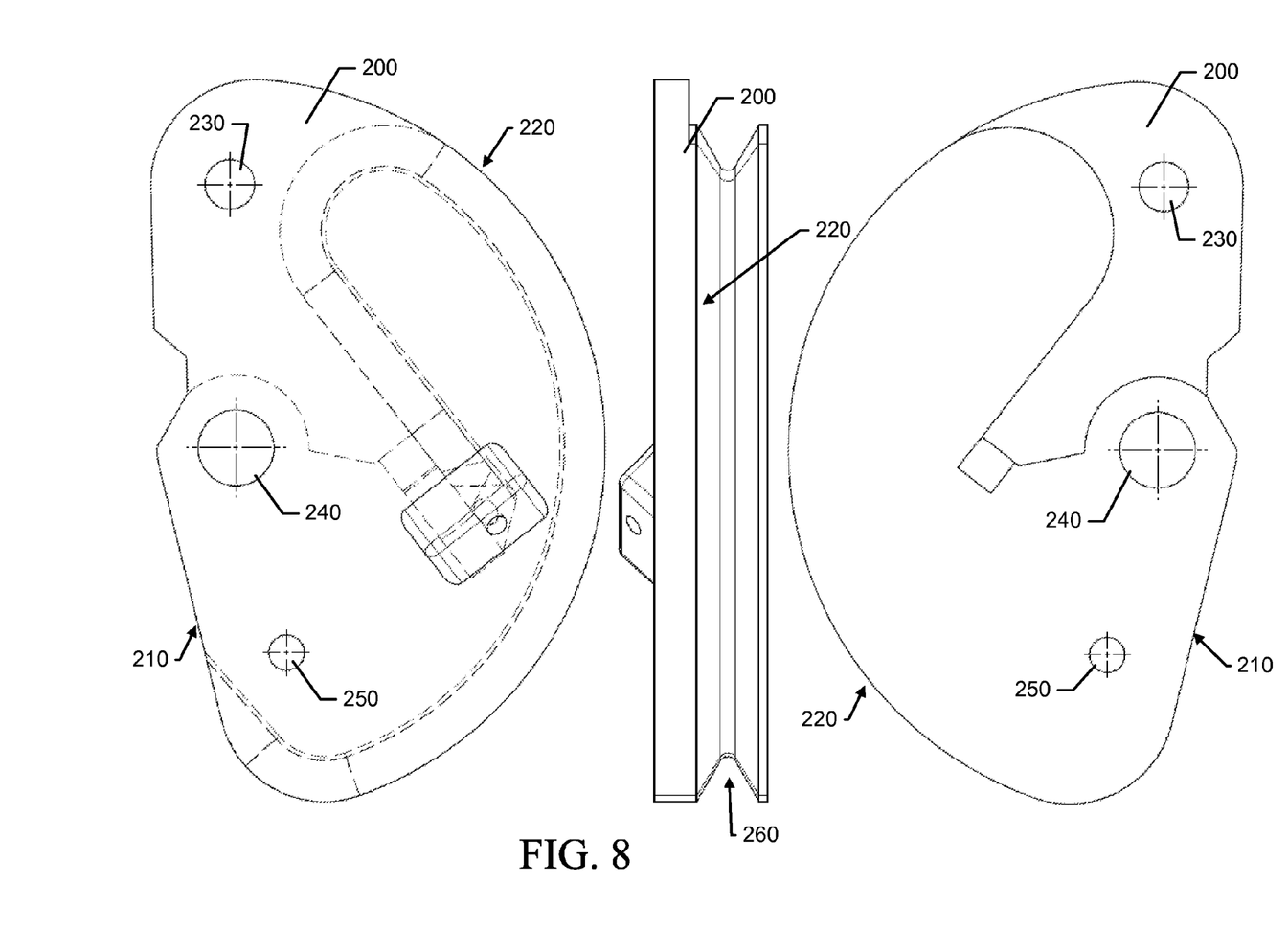
FIG. 8 illustrates a plan view of a cam according to an example embodiment.

Portions of the steering assembly 30 of the riding yard maintenance vehicle 10 will now be described in greater detail in reference to FIGS. 2-8. In this regard, FIG. 2 illustrates a perspective view of a frame of the riding yard maintenance vehicle including some portions of the steering assembly according to an example embodiment. FIG. 3 illustrates a perspective view of the underside of a forward portion of the riding yard maintenance vehicle 10 according to an example embodiment. FIG. 4 illustrates a bottom view of the forward portion of the riding yard maintenance vehicle 10 in FIG. 3 according to an example embodiment. FIG. 5 illustrates a bottom view of the forward portion of the riding yard maintenance vehicle 10 with a steering input inserted according to an example embodiment. FIG. 6 illustrates a perspective view of cable wrapped around and affixed to the steering shaft according to an example embodiment. FIG. 7 illustrates a plan view of a retention feature disposed in a steering shaft according to an example embodiment. FIG. 8 illustrates a plan view of a cam according to an example embodiment.

As shown in FIG. 2, the engine 50, the steering assembly 30, the cutting deck 40, the seat 20 and other components of the riding yard maintenance vehicle 10 may be operably connected (directly or indirectly) to a frame 70 of the riding yard maintenance vehicle 10. The frame 70 may be a rigid structure configured to provide support, connectivity and interoperability functions for various ones of the components of the riding yard maintenance vehicle 10.

In an example embodiment, the steering assembly 30 may include a steering wheel 80 and a steering shaft 82 (or column). The steering shaft 82 may operably connect to the steering wheel 80 and additional steering assembly components that translate inputs in the form of motion of the steering wheel 80 into steering controls to the wheels to which steering inputs are provided (e.g., the front wheels in this example).

Moreover, in some embodiments, the steering shaft 82 may extend into a steering console 84, which may provide a cover to improve the aesthetic appearance of the riding yard maintenance vehicle 10 by obscuring the view of various mechanical components associated with the steering assembly 30.

In some example embodiments, the steering assembly 30 may be embodied as an assembly of metallic or other rigid components that may be welded, fitted, bolted or otherwise operably coupled to each other and coupled to the wheels of the riding yard maintenance vehicle 10 to which steering inputs are provided (e.g., front wheels 42). For example, the steering assembly 30 may include or otherwise be coupled with a steering cable assembly to translate rotational motion applied to the steering assembly 30 (and more particularly to the steering wheel 80) into directional inputs to orient the wheels to which steering inputs are provided (e.g., front wheels 42 in this example) accordingly.

FIG. 3 illustrates a perspective view of portions of the steering assembly 30 as they relate to coupling the steering wheel 80 to the front wheels 42. FIG. 4 illustrates a bottom view of the forward portion of the riding yard maintenance vehicle 10 according to an example embodiment. As shown in FIGS. 3 to 5, the frame 70 may support some of the components associated with the steering cable assembly. In this regard, for example, the frame 70 may support one or more brackets, plates, or other structural members to which pulleys, cams or other structures of the steering cable assembly may be coupled. For example, the frame 70 may support an axle mount 90, which may lie substantially perpendicular to a longitudinal centerline of the frame 70 (and the riding yard maintenance vehicle 10) and extend between the front wheels 42 to provide support for mounting of the front wheels 42.

Each of the front wheels 42 may be affixed or otherwise operably coupled to corresponding ones of a first axle rod 92 and a second axle rod 94. The first and second axle rods 92 and 94 may be rotatably mounted to opposite ends of the axle mount 90. In some examples, the axle mount 90 may be structured as a single assembly, weldment, rod, tube or other support structure having a first distal end that rotatably engages the first axle rod 92 and a second distal end that rotatably engages the second axle rod 94. In some embodiments, the first and second distal ends of the axle mount 90 may terminate in respective first and second sleeves. For the sake of simplicity, FIG. 3 only illustrates one of the first and second sleeves, namely the first sleeve 96. The first and second sleeves may receive the first and second axle rods 92 and 94, respectively, therein. In some embodiments, the first and second sleeves may further include bearings (e.g., a bushing, ball bearing or journal bearing) to facilitate rotational relative motion between the first and second sleeves and the first and second axle rods 92 and 94, respectively. Thus, the rotatable engagement between the axle mount 90 and the first and second axle rods 92 and 94 may be provided by the first and second sleeves, respectively.

The first and second axle rods 92 and 94 may be constructed to have at least two linear portions that are connected to each other by a bent portion. The two linear portions may include a spindle or top portion that is inserted into one of the sleeves (e.g., the second sleeve 96 or the first sleeve) for rotatable connection therewith, and an axle or bottom portion to which one of the front wheels 42 is rotatably attached. In an example embodiment, the bent portion may be formed such that the top portion may form a 90 degree or an obtuse angle with respect to the bottom portion. The rotatable engagement between the axle mount 90 and the first and second axle rods 92 and 94 may enable the steering cable assembly to operate to cause rotation of the first and second axle rods 92 and 94 within their respective sleeves responsive to steering inputs provided at the steering wheel 80.

In an example embodiment, the steering cable assembly may include a cable 100. Although the cable 100 may be a wire or metallic fiber based member, it should be appreciated that the cable 100 could alternatively be embodied as any flexible elongate member that may be used to translate forces between components attached thereto responsive to movement of one portion thereof. Thus, for example, the cable 100 may be made of metallic, natural or synthetic fibers, or may be a substantially unitary piece of synthetic material or a collection of fitted metallic, natural or synthetic materials. As such, in some embodiments, the cable 100 could be embodied as a belt or chain. In one example embodiment, the cable 100 may be embodied as a 5/32 inch, 7×19, stainless steel aircraft cable. However, other cables could alternatively be used in varying sizes and construction to provide desired wear resistance and performance characteristics.

The cable 100 may be fixedly attached to the steering shaft 82 as shown in greater detail in FIGS. 6 and 7. In an example embodiment, the steering shaft 82 may include a wheel head 83 that may be similar to a pulley wheel except that the wheel head 83 may be fixed to the end or another portion of the steering shaft 82. The cable 100 may be wrapped around the steering shaft 82 within the wheel head 83. Although the example in FIGS. 2-8 does not employ gears, it should be appreciated that any desirable turn ratio for the steering wheel 80 and the wheel head 83 may be provided using gears or linkages configured to provide such a turn ratio. In some embodiments, a relatively smaller sized wheel head 83 may provide increased mechanical advantage relative to exerting forces via the cable 100 to affect steering responsive to operator inputs at the steering wheel 80. In the example of FIGS. 6 and 7, the wheel head 83 may be a one inch diameter drum on which the cable 100 wraps. However, larger or smaller diameter drums may be used in other examples and with other sized cables.

In some embodiments, such as the example of FIG. 6, the cable 100 may include a bead, detent or other protrusion 110 that may be crimped, welded or otherwise affixed to or included in the cable 100. The protrusion 110 may then fit within a retention feature 112 that may be affixed to, or integrally formed in, a portion of the steering shaft 82. The retention feature 112 may be a metal bracket, clamp or other device that is welded, bolted, or otherwise fixedly attached to the steering shaft 82 to provide a rigid attachment point for the protrusion 110 to engage. However, in an example embodiment such as that which is illustrated in FIG. 7, the retention feature 112 may simply be a receiving orifice formed in the wheel head 83 to receive the protrusion 110. The receiving orifice, if employed, may be shaped to correspond to a shape of the protrusion 110. Thus, for example, the protrusion 110 may fit within the retention feature 112 and cause the corresponding portion of the cable 100 to be fixed to the steering shaft 82 at the retention feature 112. In some embodiments, the retention feature 112 may include a tightening screw or other releasable clamping device to assist or otherwise provide for affixing the cable 100 to the retention feature 112. The combination of the retention feature 112 and the protrusion 110 may prevent the cable 100 from sliding when the steering shaft 82 is rotated, and may therefore provide a snug or tight feel to the steering assembly 30.

As shown in FIGS. 3 and 6, the cable 100 may be wrapped around the steering shaft 82 (e.g., at the wheel head 83, if included) at least one full turn on each opposing side of the retention feature 112 to provide excess cable to account for rotation of the steering wheel 80. The engagement of the retention feature 112 to the protrusion 110 may ensure that the cable 100 does not slip or slide on the steering shaft 82 when the steering shaft 82 is rotated (e.g., responsive to movement of the steering wheel 80). Furthermore, the at least one full turn of excess cable on each side of the retention feature 112 may provide for sufficient cable to be let out toward one of the front wheels 42 responsive to turning of the steering wheel 80 without letting out all excess cable and reaching the point where the portion of the cable 100 that is affixed to the steering shaft 82. Thus, sufficient excess cable may be provided to ensure that for even the maximum possible magnitude of turn that can be inserted on the steering wheel 80 and/or realized at the front wheels 42, cable can be let out toward one of the front wheels 42 without reaching a hard stop at the point where the portion of the cable 100 is affixed to the steering shaft 82. As a steering input is provided to the steering wheel 80 and translated to the steering shaft 82 to cause rotation of the steering shaft 82, excess cable may be let out in one direction while additional cable is wound up onto the steering shaft 82 from the other direction.

As shown in FIGS. 3 to 5, the steering shaft 82 may extend through a portion of the frame 70 and through a support plate 120. In some cases, the steering shaft 82 may be at an angle of other than 90 degrees relative to a plane of the support plate 120. The support plate 120 of some example embodiments may be disposed rearward of the front wheels 42 on the underside of the frame 70. Moreover, the steering shaft 82 may extend through the support plate 120 at a location that is substantially along the longitudinal centerline of the riding yard maintenance vehicle 10. In some embodiments, the support plate 120 may also support a first set of guide pulleys (e.g., first pulley 122 and second pulley 124). The first and second pulleys 122 and 124 may be disposed forward and outboard of the steering shaft 82. In other words, the first and second pulleys 122 and 124 may be positioned closer to the front wheels 42 than the steering shaft 82 while one of the pulleys of the first set of guide pulleys (e.g., the first pulley 122) may be disposed to be displaced from the longitudinal centerline by a predetermined distance and the other one of the pulleys of the first set of guide pulleys (e.g., the second pulley 124) may be disposed to be displaced from the longitudinal centerline by the predetermined distance on the opposite side of the longitudinal centerline. Thus, the first and second pulleys 122 and 124 may mirror each other relative to the longitudinal centerline of the riding yard maintenance vehicle 10 as shown in FIG. 4. In an example embodiment, as shown in FIG. 3, the first and second pulleys 122 and 124 may also each be disposed to lie in a plane that is at an angle relative to the plane in which the support plate 120 lies. In this regard, for example, the first and second pulleys 122 and 124 may each be canted outward at substantially equal cant angles.

The cable 100 may extend from the steering shaft 82 in two different directions to each respective one of the first and second pulleys 122 and 124. A respective different portion of the cable 100 may then further extend from each respective one of the first and second pulleys 122 and 124 to respective turn magnification assembly components associated with each respective one of the front wheels. In this regard, the steering cable assembly (or cable system) may be indirectly coupled to the first and second axle rods 92 and 94 via the turn magnification assembly in order to achieve a mechanical advantage for implementing turning of the wheels 42. The turn magnification assembly may include cams disposed in association with each respective one of the front wheels 42. The cams may include a first cam 134 and a second cam 136. The first and second cams 134 and 136 may be operably coupled to a first steering knuckle 140 and a second steering knuckle 142, respectively, via respective ones of a first linkage member 144 and a second linkage member 146. The first and second steering knuckles 140 and 142 may be affixed to respective ones of the first and second axle rods 92 and 94. In some embodiments, the first and second cams 134 and 136 may each be plate shaped cams having a substantially circular (or half-circular) profile when viewed from the top or bottom. The first and second cams 134 and 136 may each engage respective ends of the cable 100.

Accordingly, the cable 100 may be indirectly coupled to steering knuckles associated with each respective one of the front wheels via the turn magnification assembly. By indirectly coupling the cable to the steering knuckles, the linkage members may be used to geometrically increase the amount of turn that is achievable with a given cam rotation angle relative to an embodiment in which the same given cam rotation angle is used in the context of a cam that is directly coupled to both the steering knuckle and the cable 100.

FIG. 8, which includes FIGS. 8A, 8B and 8C, illustrates a plan view of a body of one of the first and second cams 134 and 136. In this regard, FIG. 8A illustrates a top view of a cam, FIG. 8B illustrates a side view of the cam, and FIG. 8C illustrates a bottom view of the cam. As shown in FIG. 8, a cam body 200 may be provided with substantially linear leg 210 and a curved leg 220, which substantially forms a semicircle that extends in an arcuate path from one end of the linear leg 210 to the other end of the linear leg 210 to define the cam body 200. In this example, the linear leg 210 may be substantially disengaged from the cable 100 (shown in dashed lines in FIG. 8). Meanwhile, the cable 100 may extend around a periphery of a substantial portion of the curved leg 220. Moreover, the cable 100 may terminate inside the cam body 200 (with or without a tensioning device being associated therewith).

The cam body 200 may include a linkage member connector 230 disposed at a forward portion of the cam body 200 (relative to the front of the riding yard maintenance vehicle 10). The linkage member (e.g., the first or second linkage member 144 or 146) may operably couple (e.g., via a rotatable connection or joint) to the cam body 200 at the linkage member connector 230. The cam body 200 may also include an axle receiver 240 formed as a receiving hole in the cam body 200 to receive an axle mounted to the axle mount 90. The axle may protrude downward from the axle mount 90 and the cam may be rotatable around the axle at the axle receiver 240. The axle receiver 240 may be positioned proximate to the linear leg 210 to form an axis of rotation about which the cam turns. In an example embodiment, the cam body 200 may further include a track rod receiver 250 formed at a rear portion of the cam body 200 (relative to the front of the riding yard maintenance vehicle 10). In some embodiments, the cam body 200 may also include a cable receiver 260 defining a groove for receiving the cable 100. The cable 100 may terminate at a cable termination 270, which may enable tension adjustments to be made in some embodiments. In an example embodiment, the cams (e.g., the first and second cams 134 and 136) may be Pitman arms to which a track rod 280 may be mounted (e.g., at the respective track rod receiver 250 associated with each cam). The track rod 280 may extend between the first and second cams 134 and 136 to link the first and second cams 134 and 136 together mechanically. The Pitman arms (e.g., the first and second cams 134 and 136) may be angled inwardly (e.g., along the linear leg 210) as they extend toward a back of the riding yard maintenance vehicle 10 to a point where the track rod 280 is supported. Thus, the track rod 280 may be of a shorter length than the distance between the front wheels 42 and the angle provided to the first and second cams 134 and 136. The angle of the first and second cams 134 and 136 as they extend back to where the track rod 280 is supported may be selected to approximate Ackermann geometry steering. As such, for example, the angling of the first and second cams 134 and 136 may be such that, when a steering input is provided to one of the front wheels 42, the inside wheel relative to the turning direction is turned at a sharper angle than the outside wheel as shown in FIG. 5.

In an example embodiment, first and second steering knuckles 140 and 142 may be relatively mirror image reproductions of each other oriented to operate on opposite sides of the riding yard maintenance vehicle 10. Similarly, the first and second axle rods 92 and 94 may be relatively mirror image reproductions of each other oriented to operate on opposite sides of the riding yard maintenance vehicle 10. Accordingly, for purposes of explanation, the first steering knuckle 140 and the first axle rod 92 will be described in greater detail below, but it should be appreciated that the second steering knuckle 142 and the second axle rod 94 are structured and function similarly (albeit for an opposite side of the riding yard maintenance vehicle 10).

The first steering knuckle 140 may be affixed to the first axle rod 92 proximate to a bottom portion of the first sleeve. The first steering knuckle 140 may, in some cases, be a bracket formed from sheet metal or another rigid material and may extend around all sides of the first axle rod 92, but include angled extensions that extend in forward and aft directions from the first axle rod 92. As such, a substantial portion of the first steering knuckle 140 may lie in a single plane, which may be substantially perpendicular to the longitudinal length of the first sleeve. In some embodiments, the first steering knuckle 140 may be attached to its corresponding cam (e.g., the first cam 134) via its corresponding linkage member (e.g., first linkage member 144). In an example embodiment, the first steering knuckle 140 may include one or more receiving openings to receive a corresponding protrusion from the first linkage member 144 proximate to one end of the first linkage member 144. An opposite end of the first linkage member 144 may also have a protrusion extending therefrom into the linkage member connector 230 of the first cam 134. The first linkage member 144 may be an elongate member, which in some cases may include a bend disposed approximately midway along a length thereof. The first linkage member 144 may therefore link the first steering knuckle 140 to the first cam 134 such that movements of the cable 100 are translated to the wheels 42 via the turn magnification assembly formed by the combination of the steering knuckles, linkage members and cams. The cable 100 may then be wrapped from a corresponding one of the set of pulleys (e.g., the first pulley 122 and the second pulley 124) to each respective cam (e.g., the first cam 134 and the second cam 136). In an example embodiment, the cable 100 may wrap around an interior or inwardly facing portion of the first cam 134 and the second cam 136 and terminate at a corresponding one of the cable terminations 270 (which may be tension adjusters in some cases). The cable terminations 270 may be configured to prevent over compression of the cable 100 and may be tightenable using an adjustment screw or other mechanism to stretch the cable 100.

In an example embodiment, as shown in FIG. 4, the cable 100 may wrap around the steering shaft 82 and then pass over an outer side of the set of guide pulleys. The cable 100 may then pass from the set of guide pulleys to the cams and extend around an inward and forward portion of the cams to extend outward toward each of the front wheels 42 before curving back into the cams to terminate at the corresponding cable terminations 270. The wrapping of the cable 100 around the cams, coupled with the shape of the cams gives an increased mechanical advantage for turning of the front wheels 42 relative to the forces that would be provided if the cable 100 was directly mounted to the steering knuckles. Moreover, the first and second linkage members 144 and 146 provide further mechanical advantage by magnifying the movement transmitted to the corresponding ones of the first and second steering knuckles 140 and 142 responsive to movement of the first and second cams 134 and 136. Accordingly, example embodiments provide an indirect cable link from the steering shaft to each respective one of the front wheels 42 by providing engagement of the cable 100 to the turn magnification assembly embodied by the cams that are affixed to the spindle of each respective axle rod to which the front wheels 42 are rotatably coupled via a corresponding linkage member and steering knuckle. Thus, as the cable 100 is pulled, the cams are rotated, and the front wheels 42 are correspondingly rotated to a direction determined based on positioning of the steering wheel 80, but the amount of wheel turn achievable is magnified by the turn magnification assembly.

As an example, referring to FIG. 5, if the steering wheel 80 is turned such that the direction of motion of the steering shaft 82 is as indicated by arrow 170, cable 100 is pulled away from the right one of the front wheels 42 (the top wheel, pictured on the left of the frame 70 in FIG. 5 due to the fact that FIG. 5 presents a bottom view) as indicated by arrow 172. The pulling of the cable 100 away from the right front wheel causes cable to be wound up onto the steering shaft 82 and causes the forward portion of the first cam 134 to be pulled. As the cable in the first cam 134 is pulled, the first cam 134 tends to rotate about the axle receiver 240 such that the forward portion of the first cam 134 is drawn inwardly toward a longitudinal centerline of the riding yard maintenance vehicle 10, while a rear portion of the first cam 134 is pushed outwardly away from the longitudinal centerline. The pulling of the forward portion of the first cam 134 inwardly causes the first linkage member 144 to be drawn inwardly as well. This further causes the forward portion of the first steering knuckle 140 to be drawn inwardly thereby rotating the wheel 42 for a left turn.

Meanwhile, track rod 280 is moved due to rotation of the first cam 134 such that the track rod 280 shifts leftward and pulls a rear portion of the second cam 136 inwardly. As the second cam 136 rotates, the length of the track rod 280 and the angle of the linear legs of the cams causes a greater degree of rotation of the second cam 136 as shown by arrow 174. The rotation of the second cam 136 is translated to the second steering knuckle 142 via the second linkage member 146 as the cable 100 released from the steering shaft 82 may be taken up within the cable receiver 260 of the second cam 316 causing rotation of the left one of the front wheels 42 as shown by arrow 176. As can be seen in FIG. 5, the length of the track rod 280 coupled with the shapes of the cams causes more turning of the inside wheel (i.e., the left one of the front wheels 42) than that which is experienced at the outside wheel in order to approximate Ackermann geometry steering.

In some embodiments, a method of providing cable controlled steering for a riding yard maintenance vehicle may be provided. In such embodiments, the method may include providing a steering assembly including a steering apparatus operably coupled to front wheels of the riding yard maintenance vehicle via a cable system and wrapping a cable around a portion of a steering shaft operably coupled to the steering apparatus. The cable may terminate at corresponding portions of a turn magnification assembly that indirectly couples the cable to the front wheels, the turn magnification assembly configured to approximate Ackermann geometry steering of respective ones of the front wheels based on movement of the cable responsive to rotation of the steering shaft.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A riding yard maintenance vehicle comprising:
   a frame to which wheels of the riding yard maintenance vehicle are attachable;
   a steering assembly comprising a steering apparatus comprising a steering shaft operably coupled to front wheels of the riding yard maintenance vehicle via a cable system; and
   a cable forming a portion of the cable system, the cable being operably coupled to the steering shaft, the cable terminating at respective ends thereof at corresponding portions of a turn magnification assembly that indirectly couples the cable to the front wheels, the turn magnification assembly configured to approximate Ackermann geometry steering of respective ones of the front wheels based on movement of the cable responsive to rotation of the steering shaft,
   wherein the turn magnification assembly comprises:
   a first cam associated with one of the front wheels;
   a second cam associated with another of the front wheels;
   a first steering knuckle disposed proximate to the one of the front wheels and the first cam, the first steering knuckle being operably coupled to a first axle rod;
   a second steering knuckle disposed proximate to the other of the front wheels and the second cam, the second steering knuckle being operably coupled to a second axle rod;
   a first linkage member extending between the first cam and the first steering knuckle at respective portions of the first cam and the first steering knuckle that are spaced apart from corresponding axes of rotation of the first cam and the first steering knuckle; and
   a second linkage member extending between the second cam and the second steering knuckle at respective portions of the second cam and the second steering knuckle that are spaced apart from corresponding axes of rotation of the second cam and the second steering knuckle, wherein respective ends of cable terminate at the first cam and the second cam.

2. The riding yard maintenance vehicle of claim 1, further comprising at least one set of guide pulleys comprising a first pulley and a second pulley, the first and second pulleys being disposed on opposing sides of a longitudinal centerline of the frame forward of the steering shaft to guide the cable to respective ones of the first and second cams.

3. The riding yard maintenance vehicle of claim 1, further comprising an axle mount coupled to the frame and extending in a direction between the front wheels, the axle mount providing support for both the first and second cams and the first and second steering knuckles such that the first and second cams and the first and second steering knuckles each rotate about their respective axes extending substantially perpendicular to the axle mount and spaced apart from each other.

4. The riding yard maintenance vehicle of claim 3, wherein the first linkage member extends between the first cam and the first steering knuckle in a direction substantially parallel to a direction of extension of the axle mount, and wherein the second linkage member extends between the second cam and the second steering knuckle in a direction substantially parallel to the direction of extension of the axle mount.

5. The riding yard maintenance vehicle of claim 1, wherein rotation of the steering shaft causes an amount of cable to be pulled away from the first cam based on a magnitude of a steering input provided at the steering apparatus, and causes an equal amount of cable to be taken up by the second cam, and wherein more rotational movement of the second cam is required to take up the equal amount of cable compared to rotational movement of the first cam to provide the amount of cable.

6. The riding yard maintenance vehicle of claim 1, wherein the first steering knuckle is affixed to a spindle portion of the first axle rod and the second steering knuckle is affixed to a spindle portion of the second axle rod.

7. The riding yard maintenance vehicle of claim 6, wherein a track rod is provided to extend between the first and second cams.

8. The riding yard maintenance vehicle of claim 7, wherein the first and second cams each comprise surfaces that are angled inwardly along respective lengths of the first and second cams as the first and second cams extend toward a rear of the riding yard maintenance vehicle.

9. The riding yard maintenance vehicle claim 8, wherein angling of each of the first and second cams is provided to approximate the Ackermann geometry steering.

10. The riding yard maintenance vehicle of claim 1, wherein opposite ends of the cable are affixed to respective ones of the first and second cams and do not contact either of the first and second steering knuckles.

11. The riding yard maintenance vehicle of claim 1, wherein the cable comprises a protrusion provided at a midpoint of the cable, and wherein the protrusion is affixed to a retention feature disposed on a portion of the steering shaft.

12. The riding yard maintenance vehicle of claim 11, wherein the protrusion comprises a bead crimped onto the cable, and wherein the retention feature comprises a receiving orifice configured to receive the bead.

13. The riding yard maintenance vehicle of claim 11, wherein the protrusion comprises a bead crimped onto the cable, and wherein the retention feature comprises a bracket or clamp configured to receive the bead.

14. The riding yard maintenance vehicle of claim 1, wherein the cable is wrapped around a portion of the steering shaft.

15. A cable system for providing operable coupling between a steering apparatus of a riding yard maintenance vehicle and front wheels of the riding yard maintenance vehicle, the cable system comprising:
a cable operably coupled to a steering shaft operably coupled to the steering apparatus, the cable terminating at respective ends thereof at respective portions of a turn magnification assembly that indirectly couples the cable to the front wheels, the turn magnification assembly configured to approximate Ackermann geometry steering of respective ones of the front wheels based on movement of the cable responsive to rotation of the steering shaft; and
at least one set of guide pulleys receiving respective different portions of the cable to guide the cable to respective portions of the turn magnification assembly,
wherein the turn magnification assembly comprises:
a first cam associated with one of the front wheels;
a second cam associated with another of the front wheels;
a first steering knuckle disposed proximate to the one of the front wheels and the first cam, the first steering knuckle being operably coupled to a first axle rod;
a second steering knuckle disposed proximate to the other of the front wheels and the second cam, the second steering knuckle being operably coupled to a second axle rod;
a first linkage member extending between the first cam and the first steering knuckle at respective portions of the first cam and the first steering knuckle that are spaced apart from corresponding axes of rotation of the first cam and the first steering knuckle; and
a second linkage member extending between the second cam and the second steering knuckle at respective portions of the second cam and the second steering knuckle that are spaced apart from corresponding axes of rotation of the second cam and the second steering knuckle,
wherein respective ends of cable terminate at the first cam and the second cam.

16. The cable system of claim 15, wherein the at least one set of guide pulleys comprises a first pulley and a second pulley, the first and second pulleys being disposed on opposing sides of a longitudinal centerline of a frame of the riding yard maintenance vehicle forward of the steering shaft to guide the cable to respective ones of the first and second cams.

17. The cable system of claim 16, further comprising an axle mount coupled to the frame and extending in a direction between the front wheels, the axle mount providing support for both the first and second cams and the first and second steering knuckles such that the first and second cams and the first and second steering knuckles each rotate about their respective axes extending substantially perpendicular to the axle mount and spaced apart from each other.

18. The cable system of claim 15, wherein the first linkage member extends between the first cam and the first steering knuckle in a direction substantially parallel to a direction of extension of the axle mount, and wherein the second linkage member extends between the second cam and the second steering knuckle in a direction substantially parallel to the direction of extension of the axle mount.

19. The cable system of claim 15, wherein the cable is wrapped around a portion of the steering shaft.

20. A method of providing cable controlled steering for a riding yard maintenance vehicle comprising:
providing a steering assembly comprising a steering apparatus operably coupled to front wheels of the riding yard maintenance vehicle via a cable system;

operably coupling a cable to a steering shaft operably coupled to the steering apparatus, the cable terminating at respective ends thereof at corresponding portions of a turn magnification assembly that indirectly couples the cable to the front wheels, the turn magnification assembly configured to approximate Ackermann geometry steering of respective ones of the front wheels based on movement of the cable responsive to rotation of the steering shaft; and providing at least one set of guide pulleys to receive respective different portions of the cable to guide the cable to respective portions of the turn magnification assembly, wherein the turn magnification assembly comprises:

a first cam associated with one of the front wheels;

a second cam associated with another of the front wheels;

a first steering knuckle disposed proximate to the one of the front wheels and the first cam, the first steering knuckle being operably coupled to a first axle rod;

a second steering knuckle disposed proximate to the other of the front wheels and the second cam, the second steering knuckle being operably coupled to a second axle rod;

a first linkage member extending between the first cam and the first steering knuckle at respective portions of the first cam and the first steering knuckle that are spaced apart from corresponding axes of rotation of the first cam and the first steering knuckle; and a second linkage member extending between the second cam and the second steering knuckle at respective portions of the second cam and the second steering knuckle that are spaced apart from corresponding axes of rotation of the second cam and the second steering knuckle, wherein respective ends of cable terminate at the first cam and the second cam.

\* \* \* \* \*